US010261852B2

(12) United States Patent
Benedict et al.

(10) Patent No.: US 10,261,852 B2
(45) Date of Patent: Apr. 16, 2019

(54) MEMORY ERROR DETERMINATION

(71) Applicant: Hewlett Packard Enterprise Development LP, Houston, TX (US)

(72) Inventors: Melvin K. Benedict, Magnolia, TX (US); Andrew C. Walton, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/894,220

(22) PCT Filed: May 31, 2013

(86) PCT No.: PCT/US2013/043686
§ 371 (c)(1),
(2) Date: Nov. 25, 2015

(87) PCT Pub. No.: WO2014/193412
PCT Pub. Date: Dec. 4, 2014

(65) Prior Publication Data
US 2016/0103726 A1  Apr. 14, 2016

(51) Int. Cl.
*G06F 11/07* (2006.01)
*G06F 11/10* (2006.01)
*G06F 3/06* (2006.01)

(52) U.S. Cl.
CPC .......... *G06F 11/079* (2013.01); *G06F 11/073* (2013.01); *G06F 11/076* (2013.01); *G06F 11/0751* (2013.01); *G06F 11/0787* (2013.01); *G06F 11/1004* (2013.01); *G06F 3/0619* (2013.01)

(58) Field of Classification Search
CPC ............. G06F 11/1004; G06F 11/1048; G06F 11/073; G06F 3/0619; G06F 3/0679
See application file for complete search history.

(56) References Cited

U.S. PATENT DOCUMENTS

| 5,303,364 A | 4/1994 | Mayer et al. |
| 5,883,849 A | 3/1999 | Shirley |
| 7,130,967 B2 | 10/2006 | Arimilli et al. |
| 7,234,099 B2 | 6/2007 | Gower et al. |
| 2002/0032837 A1* | 3/2002 | Larson ................ G06F 11/1076 711/115 |
| 2003/0051193 A1 | 3/2003 | Pham |
| 2007/0230265 A1 | 10/2007 | Riho et al. |
| 2008/0225614 A1 | 9/2008 | Brown |
| 2008/0313494 A1 | 12/2008 | Hummler et al. |

(Continued)

OTHER PUBLICATIONS

PCT; "Notification of Transmittal of the International Search Report and the Written Opinion of the International Searching Authority, or the Declaration"; PCT/US2013/043686; dated Feb. 25, 2014; 10 pp.

(Continued)

*Primary Examiner* — Jigar P Patel
(74) *Attorney, Agent, or Firm* — Michael A. Dryja

(57) ABSTRACT

A technique includes accessing error information generated in response to memory errors of a memory device. The error information generated in response to the memory errors of the memory device may then be determined as indicative of a row hammer error for the memory device.

14 Claims, 4 Drawing Sheets

(56) References Cited

U.S. PATENT DOCUMENTS

| | | | |
|---|---|---|---|
| 2010/0083048 A1* | 4/2010 | Calinoiu | G06F 11/0787 |
| | | | 714/38.11 |
| 2011/0116333 A1 | 5/2011 | Nakamura | |
| 2012/0059983 A1 | 3/2012 | Nellans et al. | |
| 2012/0079314 A1 | 3/2012 | Kamath et al. | |
| 2014/0156923 A1* | 6/2014 | Bains | G11C 11/4078 |
| | | | 711/106 |
| 2014/0177370 A1* | 6/2014 | Halbert | G11C 11/40603 |
| | | | 365/222 |
| 2014/0189228 A1* | 7/2014 | Greenfield | G11C 11/40607 |
| | | | 711/106 |
| 2014/0281805 A1* | 9/2014 | Sah | G11C 29/42 |
| | | | 714/764 |
| 2015/0095564 A1* | 4/2015 | Benedict | G11C 11/4087 |
| | | | 711/105 |

OTHER PUBLICATIONS

Ganesh, B. et al., Fully-buffered DIMM Memory Architectures: Understanding Mechanisms, Overheads and Scaling, (Research Paper), Proceedings of the 13th International Symposium on High Performance Computer Architecture, Feb. 2007, pp. 109-120.

Lee, C.J. et al., Prefetch-aware DRAM Controllers, (Research Paper), Proceedings of the 41st International Symposium on Microarchitecture, 2008, pp. 200-209.

International Preliminary Report on Patentability received for PCT Patent Application No. PCT/US2013/043686, dated Dec. 10, 2015, 7 pages.

* cited by examiner

MEMORY ERROR DETERMINATION

BACKGROUND

A memory device includes memory cells to store data values. An example type of memory device is a dynamic random access memory (DRAM) device. As memory manufacturing technology has advanced, the feature size of memory cells has decreased in order to increase the density of memory cells in a memory device. Increasing the memory cell density provides increased storage capacity in the memory device.

DETAILED DESCRIPTION

Figure 1:
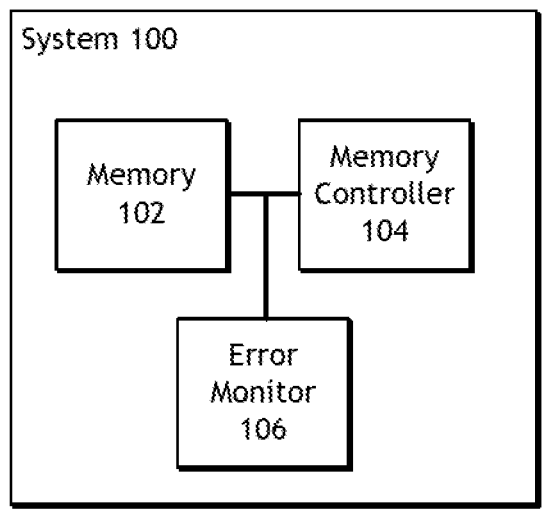
FIG. 1 is a block diagram of a system in accordance with one example of the present disclosure.

Processing a massive dataset may be quite burdensome on a memory of a computer system due to a large number of potential repeated accesses to the same or nearby memory locations in connection with this processing. The repeated accesses may be at rates that are large enough to potentially affect the integrity of the data stored in the memory.

More specifically, charges are selectively stored in the capacitor-based memory cells of a dynamic random access memory (DRAM) device to represent the corresponding stored data. Because leakage currents degrade the stored charges, the memory cells of the DRAM device are periodically refreshed, which involves reading the data stored in the DRAM's device memory cells and rewriting the data back to the memory cells. The rate at which the DRAM device is refreshed, however, may be insufficient to maintain the charge levels for certain activity. In this manner, for purposes of accessing a row of memory cells of a DRAM device, a command called an "activate command" may be issued to open the row for access.

Repeated activation of a given row at a high enough rate (activations on the order of thousands of times per refresh period, for example) may degrade data stored in adjacent word lines (a natural occurrence in the DRAM due to the relatively close spacing of the DRAM features), even though these word lines are periodically refreshed. This repeated activation error may be defined as a row hammer error. In other words, the periodic refresh intervals may be insufficient to maintain the stored data when the activation rates exceed a certain threshold.

In addition to errors caused by the repeated activation (i.e., row hammering), DRAMs remain susceptible to other types of memory errors, both soft errors which are transient and hard errors which repeat. These errors, in combination with row hammer errors may result in error information that may be utilized to determine replacement policies for the system memory.

These memory replacement policies may instruct the periodic sampling of error status registers, for example every 24 hours. The sampling may enable analysis of the errors stored therein to determine whether the error was soft, in which case there may be no need to replace the memory, or whether the error was hard, in which case there may be a need to replace the memory.

For the purposes of controlling the degradation that may otherwise occur due to the repeated activations of a given row during a refresh period, systems and techniques are disclosed herein, which may analyze error information to detect row hammer errors. By detecting row hammer errors from the error information, subsequent or additional policies may be enforced or suggested to reduce future exposure to such errors.

More specifically, systems and techniques are disclosed for accessing error information generated in response to memory errors of a memory device. Once accessed, the error information may be analyzed to determine whether the error information is indicative of a row hammer error for the memory device. In various examples determining whether the error information is indicative of a row hammer error may include the exclusion of known types of errors along with the identification of specific characteristics of row hammer errors.

Referring to FIG. 1, a block diagram of a system is illustrated in accordance with an example of the present disclosure. The system 100 includes a memory 102, a memory controller 104 coupled to the memory 102, and an error monitor 106 coupled to the memory controller 104.

Memory 102 may be any memory comprising an array of word lines and bit lines that are susceptible to row hammer errors. For the purposes of this disclosure, the memory devices discussed in the figures will be referred to as Dynamic Random Access Memory (DRAM), however, the disclosure is not so limited. In addition, the DRAM may be disposed with other DRAMs to form a dual in-line memory module (DIMM).

Memory controller 104 is a circuit which manages the flow of data going to and from memory 102. While illustrated as an independent component, memory controller 104 is not so limited. Rather, memory controller 104 may be integrated into other components such as a microprocessor (not illustrated).

Error monitor 106 may be a hardware component such as an application specific integrated circuit (ASIC), field programmable gate array (FPGA), or a processor among others. The error monitor 106 may comprise software components to enable its functionality, for example, the error monitor 106 may be embodied as computer code stored on a non-transitory computer readable medium. The computer code may be executed by a component, such as the processor.

In the illustrated example, the system 100 comprises a memory 102 which is susceptible to multiple types of errors, for example, hard errors, soft errors, and row hammer errors, among others. The memory controller 104 coupled to the memory device 102 may sample an error status register associated with the memory device 102 to generate a data base of error information. In various examples, the error information may include information such as, but not limited to, chip-select, bank address, row address, column address, hard error, soft error, and error correction masks.

With a data base of error information, error monitor 106 may determine whether the error information is indicative of a row hammer error. The determination may be based on the exclusion of various types of known errors and/or the inclusion of errors indicating particular characteristics of a row hammer error. In various examples, such particular characteristics may include, but are not limited to, whether the errors indicate a sparse population of weak cells, a finite number of weak cells for a given range of rows, a unique set of column addresses for a particular row, a unique symbol signature for particular rows and columns, whether each symbol error has a single or double bit in error, and whether there are repeated soft errors.

Figure 2:
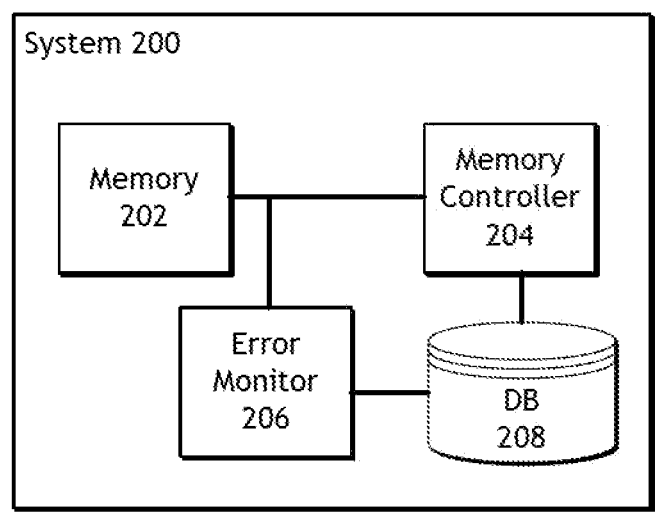
FIG. 2 is a block diagram of a system in accordance with one example of the present disclosure.

Referring to FIG. 2, another system is illustrated in accordance with an example of the present disclosure. The system 200 includes a memory 202, a memory controller 204, an error monitor 206, and a data base of error information 208. The memory 202, memory controller 204, and error monitor 206 may be similar to their respective components as illustrated in FIG. 1.

The data base of error information 208 may be stored in memory accessible by the memory controller 204. The data base of error information 208, in various examples, may be generated by the memory controller 204 sampling the error status registers of memory 202. In another example, the data base of error information 208 may be generated by the error monitor 206 sampling the error status registers of memory 202. In still other examples, the data base of error information 208 may be generated by the memory 202 depositing information for error status registers into the data base 208.

In various examples, the error information stored within the data base 208 may comprise information such as, but not limited to, chip-select, bank address, row address, column address, hard error, soft error, and error correction masks. The error information may be populated into the data base 208 as the error status registers of the memory 202 are sampled. Periodically, the error monitor 206 may analyze the error information to determine whether the error information is indicative of a row hammer error.

In one example, to determine whether the error information is indicative of a row hammer error, the error monitor 206 may analyze patterns within the error information. Patterns as used herein are collections of errors within the error information which exhibit characteristics of the row hammer errors.

In another example, to determine whether the error information is indicative of a row hammer error, the error monitor 206 is to determine that error information that indicates more than one bit has been corrected is not indicative of a row hammer error. Errors in which more than one bit has been corrected are more typical of other failure mechanisms, both hard and soft.

In another example, to determine whether the error information is indicative of a row hammer error, the error monitor 206 is to determine that error information that indicates a common chip select, bank address, row address, and more than a predetermined number of column addresses is not indicative of the row hammer error. Again, these errors are indicative of other failure mechanisms.

In another example, to determine whether the error information is indicative of a row hammer error, the error monitor 206 is to determine that error information that indicates a common chip select and bank address with a row address hamming distance less than a threshold are indicative of the row hammer error. A hamming distance between two row addresses is the number of positions at which the corresponding symbols are different.

The error monitor 206 may utilize combinations of exclusive analysis and inclusive analysis to determine whether the error information is indicative of row hammer errors. An exclusive analysis is an analysis that excludes error information as a row hammer error while an inclusive analysis is an analysis that includes error information as row hammer errors. In one example, the error monitor 206 may first exclude various types of errors and then perform an inclusive analysis on any remaining error information within the data base 208.

Once the error monitor 206 has determined that various errors of the memory device, as indicated via the corresponding error information within the data base, are associated with repeated activations or row hammering, the memory controller 206 may institute corrective policies. For example, the memory controller 206 may increase a refresh rate of the memory device in response to a determination that the error information is indicative of a row hammer error. In another example, the memory controller 206 may increase the activate or read accesses to the rows indicating row hammer errors.

In other examples, in addition to the memory controller 206 taking corrective action or in lieu of the memory controller 206 taking corrective action, various other policies may be utilized and/or instituted. For example, once row hammer errors have been detected, a user may be notified that the DIMMs or DRAMs should not be replaced since row hammer errors are not indicative of hard errors. In addition, a suggestion may be posed to a user to modify memory allocation to avoid hammering. Other responses and policies may be instituted that prevent the future occurrence of row hammer errors. By detecting patterns and row hammer errors, unnecessary replacement of functioning memory may be prevented.

Figure 3:
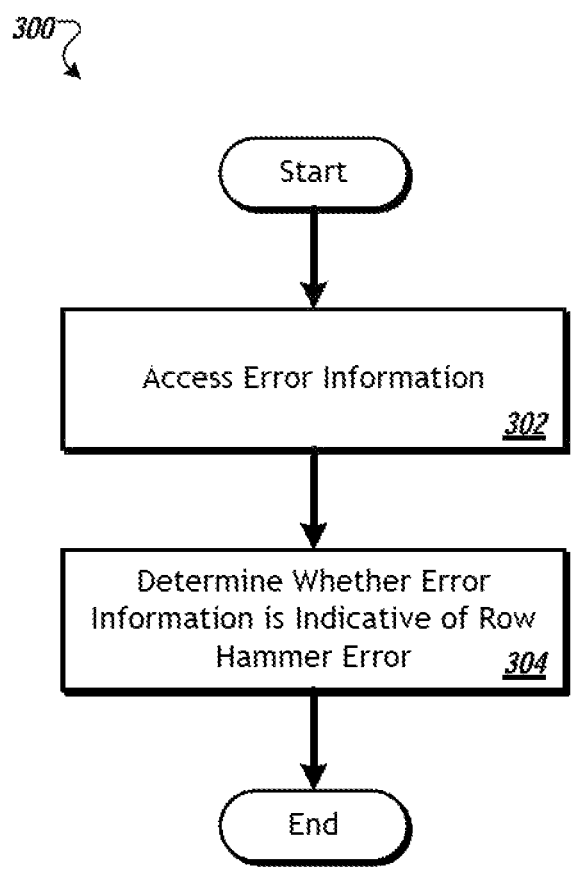
FIG. 3 illustrates a flow diagram in accordance with an example of the present disclosure.
Figure 4:
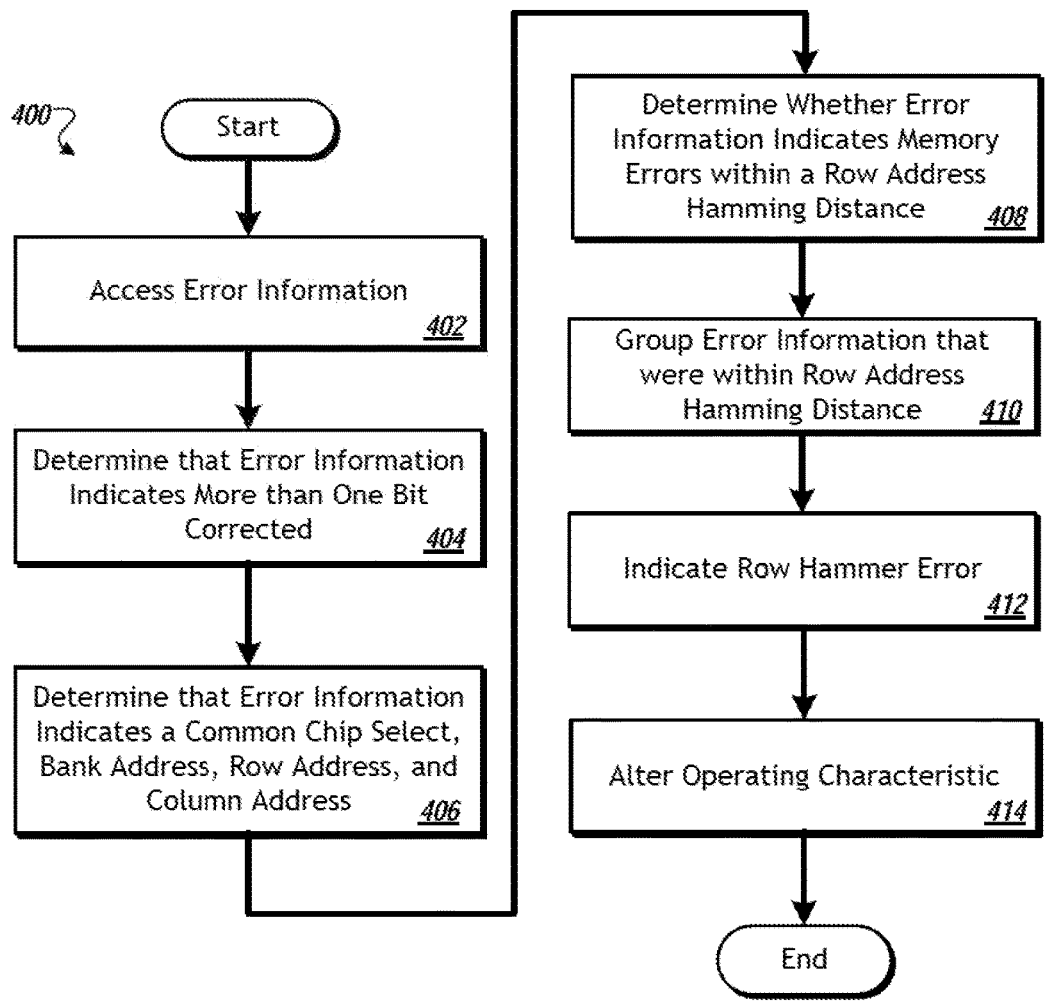
FIG. 4 illustrates a flow diagram in accordance with an example of the present disclosure.

Referring to FIGS. 3 and 4 flow diagrams are illustrated in accordance with examples of the present disclosure. The flow diagrams may illustrate various elements associated with the example systems described in the preceding Figures. The flow diagrams are merely exemplary are not meant to limit the present disclosure to any particular order or number of elements.

Referring to FIG. 3, the flow diagram 300 may begin and progress to 302 where a system such as that described with reference to FIG. 1 or 2 may access error information generated in response to memory errors of a memory device. The error information may be indicative of one or more errors and may include information such as, but not limited to, chip-select, bank address, row address, column address, hard error, soft error, and error correction masks.

Upon accessing the error information, the system may determine whether the error information is indicative of a row hammer error for the memory device. The determination may be based on an analysis of individual error information or by iteratively applying inclusive and exclusive analysis to the error information. The flow diagram 300 may then end.

Referring to FIG. 4, another example is illustrated in accordance with the present disclosure. The flow diagram 400 may begin and proceed to 402 where a system such as that described with reference to the preceding figures may access error information generated in response to memory errors of a memory device.

Upon accessing the error information, the system may determine that error information associated with at least one memory error indicates that more than one bit has been corrected at 404. In response, the error information may be excluded from error information indicative of a row hammer error. If, however, the error information indicates a single bit error was corrected, the process may continue to 406.

At 406, the system may determine whether the error information associated with at least one memory error indicates a common chip select, bank address, row address, and column address. In response, the error information may be excluded from error information indicative of a row hammer error. If, however, the error information does not indicate the common chip select, bank address, row address, and column address, then the process may continue to 408.

At 408, the system may analyze the error information to determine whether the error information indicates that the associated memory errors were within a row address hamming distance. The system may then group the error information associated with the memory errors within the row hamming distance and determine whether the grouping comprises three or fewer members at 410. Assuming the grouping comprises three or fewer members, the system may indicate the error information is indicative of a row hammer error at 412.

In response to the indication of a row hammer error, the system may alter an operating characteristic of the computing device to reduce a number of row hammer errors at 414. In various examples, this may include increasing a refresh rate of the memory device or increase the activate rate or read accesses to a row indicating errors. The flow diagram may then end.

Figure 5:
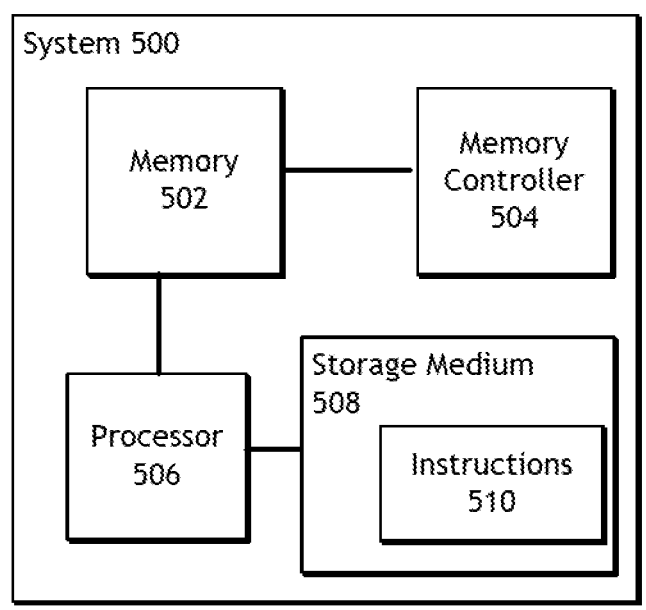
FIG. 5 illustrates a block diagram including a storage medium with instructions stored thereon in accordance with an example of the present disclosure.

Referring to FIG. 5, a block diagram of a system including a non-transitory storage medium having programming instructions stored thereon is illustrated in accordance with an example of the present disclosure. The system 500 includes a memory 502, a memory controller 504, a processor 506, and the non-transitory storage medium 508 having instructions 510 stored thereon.

In the illustrated example, the processor 504 may be configured to read and execute instructions 510 stored on storage medium 508. While illustrated as distinct components, those of ordinary skill will readily understand that various components as illustrated may be incorporated into other components.

In accordance with FIG. 5, processor 506 may be configured to analyze a data base of error associated with the memory 502. The data base of errors may be generated, in various examples, by the memory controller 504, the memory 502, or the processor 506 executing code stored within the non-transitory storage medium. In response, the processor 504 may determine that at least one of the errors associated with the memory device is a row hammer error.

It is to be understood that the storage medium 508 may comprise instructions 510 suitable to enable various functions and components as described with reference to the preceding figures.

While a limited number of examples have been disclosed herein, those skilled in the art, having the benefit of this disclosure, will appreciate numerous modifications and variations therefrom. For example, as previous discussed it is expressly contemplated that various methodologies described herein may be implemented within individual components, for example, the DRAM itself. It is intended that the appended claims cover all such modifications and variations.

What is claimed is:

1. A method comprising:
accessing, via a computing device including a memory device, error information generated in response to memory errors of the memory device, wherein the error information includes hard errors and soft errors;
determining, via the computing device, whether the error information is indicative of a row hammer error, by analyzing patterns within the error information as corresponding to row hammer error-indicating patterns, including determining whether the error information indicates the memory errors were within a row address hamming distance; and
altering, via the computing device, an operating characteristic of the computing device to reduce occurrence of row hammer errors within the memory device, in response to a determination that the error information is indicative of the row hammer error,
wherein the row hammer error is caused by a row hammer event, and the row hammer event is a repeated activation of a row of the memory device at a rate greater than a threshold,
and wherein the row address hamming distance between a first row address and a second row address is a number of positions at which corresponding symbols are different.

2. The method of claim 1, further comprising:
indicating, via the computing device, software executing on the computing device is inducing memory errors, in response to determining that the error information is indicative of a row hammer error.

3. The method of claim 1, wherein determining whether the error information is indicative of the row hammer error comprises:
determining, via the computing device, that error information associated with at least one memory error indicates that more than one bit has been corrected; and
excluding, via the computing device, the error information associated with the at least one memory error as error information indicative of the row hammer error.

4. The method of claim 1, wherein determining whether the error information is indicative of the row hammer error comprises:
determining, via the computing device, that the error information associated with at least one memory error indicates a common chip select, bank address, row address, and column address; and
excluding, via the computing device, the error information associated with the at least one memory error as error information indicative of the row hammer error.

5. The method of claim 1, wherein determining whether the error information is indicative of the row hammer error comprises:
analyzing, via the computing device, the error information, wherein the error information includes row address with common chip select and bank address; and
grouping, via the computing device, the error information associated with the memory errors that were within the row address hamming distance.

6. The method of claim 5, wherein determining whether the error information is indicative of the row hammer error further comprises:
determining, via the computing device, whether any grouping comprises three or fewer members; and
indicating, via the computing device, the error information is indicative of a row hammer error.

7. The method of claim 1, wherein altering the operating characteristic of the computing device comprises:
increasing, via the computing device, a refresh rate of the memory device.

8. The method of claim 1, wherein the hard errors are repeating errors and the soft errors are transient errors, and wherein the method further comprises:
determining, via the computing device, that the memory device is to be replaced based the row hammer errors in combination with the hard errors and the soft errors in the error information; and
in response to determining that the memory device is to be replaced, causing replacement of the memory device.

9. A system, comprising:
a memory device; and
a memory controller coupled to the memory device, wherein the memory controller is to sample an error status register associated with the memory device to generate a database of error information including hard errors that are repeating errors and soft errors that are transient errors; and
an error monitor to determine whether the error information is indicative of a row hammer error, by analyzing patterns within the error information as corresponding to row hammer error-indicating patterns, including determining whether the error information indicates the memory errors were within a row address hamming distance,
wherein the memory controller is to alter an operating characteristic of the system to reduce occurrence of row hammer errors within the memory device, in response to a determination that the error information is indicative of the row hammer error,
wherein the row hammer error is caused by a row hammer event, and the row hammer event is a repeated activation of a row of the memory device at a rate greater than a threshold,
and wherein the row address hamming distance between a first row address and a second row address is a number of positions at which corresponding symbols are different.

10. The system of claim 9, wherein the error monitor is to determine that error information that indicates more than one bit has been corrected is not indicative of the row hammer error.

11. The system of claim 9, wherein the error monitor is to determine that error information that indicates a common chip select, bank address, row address, and more than a predetermined number of column addresses is not indicative of the row hammer error.

12. The system of claim 9, wherein the error monitor is to determine that the error information that indicates a common chip select and bank address with a row address hamming distance less than a threshold are indicative of the row hammer error.

13. The system of claim 9, wherein the memory controller is to alter the operating character of the computing device by increasing a refresh rate of the memory device.

14. An article comprises a non-transitory storage medium to store instructions readable by a processor-based system which when executed by the processor-based system cause the processor-based system to:
access error information generated in response to memory errors of a memory device of the processor-based system, wherein the error information includes hard errors that are repeating errors and soft errors that are transient errors;
determine whether the error information is indicative of a row hammer error, by analyzing patterns within the error information as corresponding to row hammer error-indicating patterns, including determining whether the error information indicates the memory errors were within a row address hamming distance; and
alter an operating characteristic of the processor-based system to reduce occurrence of row hammer errors within the memory device, in response to a determination that the error information is indicative of the row hammer error,
wherein the row hammer error is caused by a row hammer event, and the row hammer event is a repeated activation of a row of the memory device at a rate greater than a threshold,
and wherein the row address hamming distance between a first row address and a second row address is a number of positions at which corresponding symbols are different.

* * * * *